US009361497B1

(12) United States Patent
Torzilli et al.

(10) Patent No.: US 9,361,497 B1
(45) Date of Patent: Jun. 7, 2016

(54) ARRANGEMENT FOR AND METHOD OF CAPTURING IMAGES OF DOCUMENTS

(71) Applicant: SYMBOL TECHNOLOGIES, LLC, Lincolnshire, IL (US)

(72) Inventors: Charles Torzilli, East Northport, NY (US); Mark E. Drzymala, Saint James, NY (US)

(73) Assignee: Symbol Technologies, LLC, Holtsville, NY (US)

( * ) Notice: Subject to any disclaimer, the term of this patent is extended or adjusted under 35 U.S.C. 154(b) by 0 days.

(21) Appl. No.: 14/690,585

(22) Filed: Apr. 20, 2015

(51) Int. Cl.
*G06K 7/10* (2006.01)
*G06K 9/32* (2006.01)

(52) U.S. Cl.
CPC ............ *G06K 7/109* (2013.01); *G06K 7/10732* (2013.01); *G06K 7/10861* (2013.01); *G06K 9/32* (2013.01)

(58) Field of Classification Search
CPC .................................. G06K 7/10; G06K 9/32

USPC .................................................. 235/454, 470
See application file for complete search history.

(56) References Cited

U.S. PATENT DOCUMENTS

| | | | | |
|---|---|---|---|---|
| 6,738,166 | B1 * | 5/2004 | Kano | H04N 1/04 358/486 |
| 8,854,700 | B2 * | 10/2014 | Kimura | H04N 1/0282 358/473 |
| 2001/0031099 | A1 * | 10/2001 | Kondo | G06K 9/42 382/275 |
| 2002/0150311 | A1 * | 10/2002 | Lynn | G06F 17/30011 382/306 |
| 2014/0009604 | A1 * | 1/2014 | Hinderling | G01C 15/002 348/142 |

* cited by examiner

*Primary Examiner* — Christle I Marshall

(57) ABSTRACT

A visible target having a predetermined target size is fixed on a document capture stand. A visible aiming light beam is directed along an aiming axis away from an imaging reader. The beam has a beam size in cross-section that changes along the aiming axis. The reader is moved relative to the stand along the aiming axis until the beam size visually matches the target size at a predetermined distance between the reader and the stand. An image of a document supported by the stand is captured at the predetermined distance.

20 Claims, 7 Drawing Sheets

ARRANGEMENT FOR AND METHOD OF CAPTURING IMAGES OF DOCUMENTS

BACKGROUND OF THE INVENTION

The present disclosure relates generally to an arrangement for, and a method of, capturing images of documents.

Imaging readers, each having a solid-state imager or image sensor, analogous to those conventionally used in consumer digital cameras, have been used to electro-optically read symbols, such as one-dimensional bar code symbols, particularly of the Universal Product Code (UPC) type, and two-dimensional bar code symbols, such as PDF417 and QR codes, and/or non-symbols or documents, such as prescriptions, labels, receipts, driver's licenses, employee badges, payment/loyalty cards, etc., each bearing alphanumeric characters, and some bearing pictures, in many different venues, such as at full-service or self-service, point-of-transaction, retail checkout systems operated by checkout clerks or customers, and located at supermarkets, warehouse clubs, department stores, and other kinds of retailers, as well as at many other types of businesses, for many years.

The imaging reader has a one- or two-dimensional array of photocells or light sensors (also known as pixels), and an imaging lens assembly for capturing return light scattered and/or reflected from a symbol/document being imaged through a scan window over a field of view, and for projecting the return light onto the sensor array to initiate capture of an image of the symbol/document over a range of working distances in which the symbol/document can be read. The imaging reader advantageously includes an aiming light assembly for projecting a visible aiming light beam whose cross-section has a pattern, for example, a generally circular spot or cross-hairs for placement at the center of the symbol/document, or a line for placement across the symbol/document, or a set of framing lines to bound the field of view, to assist an operator in visually locating the symbol/document within the field of view prior to image capture. The imager may include a one- or two-dimensional charge coupled device (CCD) or a complementary metal oxide semiconductor (CMOS) device and associated circuits for producing and processing electrical signals corresponding to a one- or two-dimensional array of pixel data over the field of view. In the case of a symbol associated with a product, these electrical signals are processed and decoded by a programmed microprocessor or controller into decoded data that identifies the product, and enables information, such as the product's price, to be retrieved from a price database. In the case of a document, these electrical signals are processed by the programmed microprocessor or controller into a picture of the document.

In typical use, the operator holds the imaging reader in his/her hand, actuates the aiming light assembly to emit the aiming beam by actuating a trigger once, visually locates a symbol with the aid of the aiming beam, aims the imaging reader at the symbol, and then captures an image of the symbol by actuating the trigger again. As part of the same transaction in which the symbol was read, or as an independent transaction, the operator may wish to capture an image of a document, such as a medical prescription. This is typically performed by placing the document on a countertop, or in a document capture stand or analogous fixture, each operative for supporting the document while an image of the document is being captured.

Yet, the above-described image capture of documents has not proven to be altogether satisfactory in practice. The document needs to be properly placed and aligned on the countertop or in the stand, and the document must be positioned at a particular working distance from the reader, in order to have substantially the entire image captured in full frame and in focus. It is known to require an operator to employ a ruler to set the correct working distance, because documents of different sizes have to be read at different working distances. It is also known to require an operator to adjust the stand by operating complex position controls. However, both of these known setting/adjustment techniques are laborious in practice, especially for an inexperienced operator who may forego practicing such techniques, with the result that an image of the entire document may not be captured, or the image may be blurred, thereby resulting in a loss of information.

Accordingly, there is a need to capture images of documents without requiring the use of rulers or operating any complex position controls in a non-laborious, easy and rapid manner to insure that substantially the entire image of each document is captured in full frame and in focus.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
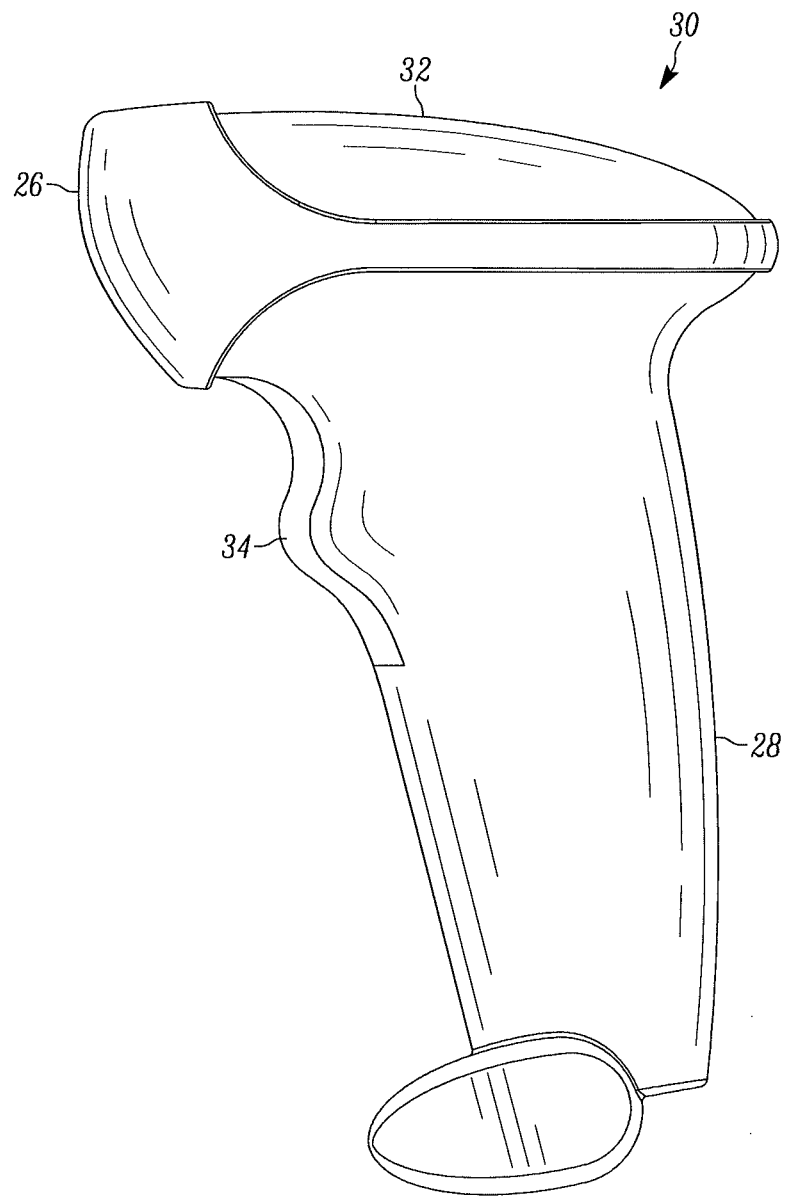
FIG. 1 is a side elevational view of an imaging reader operative for capturing images of documents in accordance with this disclosure.

Skilled artisans will appreciate that elements in the figures are illustrated for simplicity and clarity and have not necessarily been drawn to scale. For example, the dimensions and locations of some of the elements in the figures may be exaggerated relative to other elements to help to improve understanding of embodiments of the present invention.

The method and arrangement components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

One aspect of this disclosure relates to an arrangement for capturing images of documents. The arrangement includes a document capture stand and an imaging reader. A visible target having a predetermined target size is fixed on the stand. An aiming light assembly is supported by the reader, and directs a visible aiming light beam along an aiming axis. The visible aiming light beam has a beam size in cross-section that changes, e.g., increases, along the aiming axis. The reader is movable relative to the stand along the aiming axis until the beam size visually matches, e.g., is congruent to, the target size at a predetermined distance between the reader and the stand. The reader captures an image of a document supported by the stand at the predetermined distance.

A method of capturing images of documents, in accordance with another aspect of this disclosure, is performed by fixing a visible target having a predetermined target size on a document capture stand, by directing a visible aiming light beam along an aiming axis away from an imaging reader, the visible aiming light beam having a beam size in cross-section that changes, e.g., increases, along the aiming axis, by moving the reader relative to the stand along the aiming axis until the beam size visually matches, e.g., is congruent to, the target size at a predetermined distance between the reader and the stand, and by capturing an image of a document supported by the stand at the predetermined distance.

Turning now to the drawings, reference numeral 30 generally identifies an imaging reader that is ergonomically advantageously configured as a gun-shaped housing having an upper barrel or body 32 and a lower handle 28 tilted rearwardly away from the body 32. A window 26 is located adjacent the front or nose of the body 32. The imaging reader 30 is either held by the handle 28 in an operator's hand and used in a handheld mode in which a trigger 34 is manually depressed to initiate imaging of symbols/documents in a range of working distances relative to the window 26, or is mounted in a cradle 44 (see FIGS. 5-6) and used in a hands-free mode in which the trigger 34 is likewise manually depressed to initiate imaging of symbols/documents in a range of working distances relative to the window 26. Housings having configurations, other than those illustrated herein, can also be employed. The reader 30 advantageously communicates with a remote host by a wireless link, and the reader 30 is electrically powered by an on-board battery. Alternatively, a non-illustrated cable could be connected to the reader 30 to deliver power and to support bidirectional communications between the host and the reader.

Figure 2:
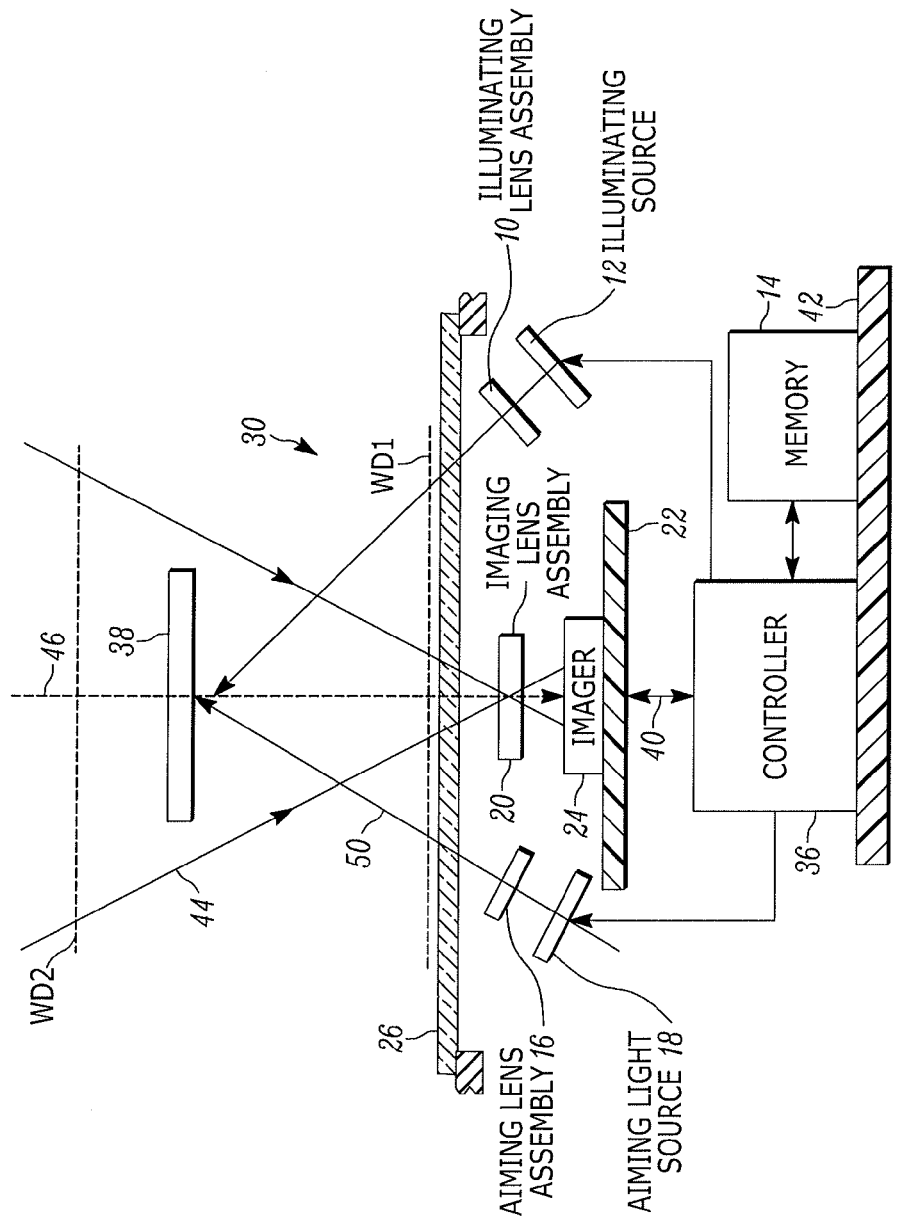
FIG. 2 is a schematic diagram of various components of the reader of FIG. 1.

As schematically shown in FIG. 2, an imager 24 is mounted on a printed circuit board 22 in the reader 30. The imager 24 is a solid-state device, for example, a CCD or a CMOS imager having a one-dimensional array of addressable image sensors or pixels arranged in a single, linear row, or a two-dimensional array of such sensors arranged in mutually orthogonal rows and columns, preferably of megapixel resolution, and operative for detecting return light captured by an imaging lens assembly 20 over a field of view 44 along an optical path or axis 46 through the window 26. The return light is scattered and/or reflected from a symbol 38 over the field of view 44. The imaging lens assembly 20 is preferably operative for adjustably focusing and projecting the return light onto the array of image sensors to enable the symbol 38 to be read. The symbol 38 is located anywhere in a working range of distances between a close-in working distance (WD1) and a far-out working distance (WD2). In a preferred embodiment, WD1 is about one to two inches from the imager array 24, and WD2 can be several feet from the window 26.

An illuminating light assembly is also mounted in the imaging reader 30 and preferably includes an illuminator or illuminating light source 12, e.g., one or more light emitting diodes (LEDs), and an illuminating lens assembly 10 to uniformly illuminate the symbol 38 with an illuminating light pattern during reading. An aiming light assembly is also mounted in the imaging reader and preferably includes an aiming light source 18, e.g., one or more LEDs, and an aiming lens assembly 16 for generating and directing a visible aiming light beam 50 away from the reader 30 onto the symbol 38. The aiming light beam 50 has a cross-section with a pattern, for example, a generally circular spot or cross-hairs for placement at the center of the symbol 38, or a line for placement across the symbol 38, or a set of framing lines to bound the field of view 44, to assist an operator in visually locating the symbol 38 within the field of view 44 prior to image capture.

As shown in FIG. 2, the imager 24, the illuminating light source 12 and the aiming light source 18 are operatively connected to a controller or programmed microprocessor 36 operative for controlling the operation of these components. A memory 14 is connected and accessible to the controller 36. The controller 36, and preferably, the memory 14, are mounted on another printed circuit board 42 spaced away from the board 22 in the reader. An electrical conductor 40, preferably a flexible cable, is connected between the controller 36 and the imager 24 on the boards 22, 42. The controller 36 processes and decodes the symbol 38 into decoded data that identifies a product associated with the symbol 38, and enables information, such as the product's price, to be retrieved from a price database.

In operation, the controller 36 sends a command signal to energize the aiming light source 18 prior to reading in response to a first actuation of the trigger 34, and also pulses the illuminating light source 12 for a short exposure time period, say 500 microseconds or less, and energizes and exposes the imager 24 to collect light, e.g., illumination light and/or ambient light, from the symbol 38 only during said exposure time period in response to a second actuation of the trigger 34. A typical array needs about 16-33 milliseconds to acquire the entire symbol image and operates at a frame rate of about 30-60 frames per second. The imager 24 thus acquires image data, and sequentially shifts and transfers the image data away from the imager 24 at a clock frequency under the control of the controller 36. The image data is transferred between the imager 24 and the controller 36 over the flexible cable 40.

In accordance with this disclosure, as part of the same transaction in which the symbol 38 was read, or as an independent transaction, the operator may wish to capture an image of a document 52 (see FIG. 4), such as a medical prescription written on a paper sheet. The document 52 is mounted on, and supported by, a document capture stand, such as a rearwardly tilted, upright stand 54 of FIG. 3, or a vertical, upright stand 56 of FIG. 4, or a horizontal stand 58 of FIG. 6. The tilted stand 54 has a generally planar support 54A, a base 54B that rests on a support surface such as a countertop 60, a lip 54C for retaining a lower edge of the document 52 and preventing the document 52 from sliding off the upright stand 54, and a kickstand or rear leg 54D for propping up the support 54A from behind. Analogously, the vertical stand 56 has a generally planar support 56A, a base 56B that rests on the countertop 60, and a lip 56C for retaining a lower edge of the document 52 and preventing the document from sliding off the upright stand 56. The horizontal stand 58 is a generally planar support that lies on, and generally parallel to, the countertop 60.

Figure 6:
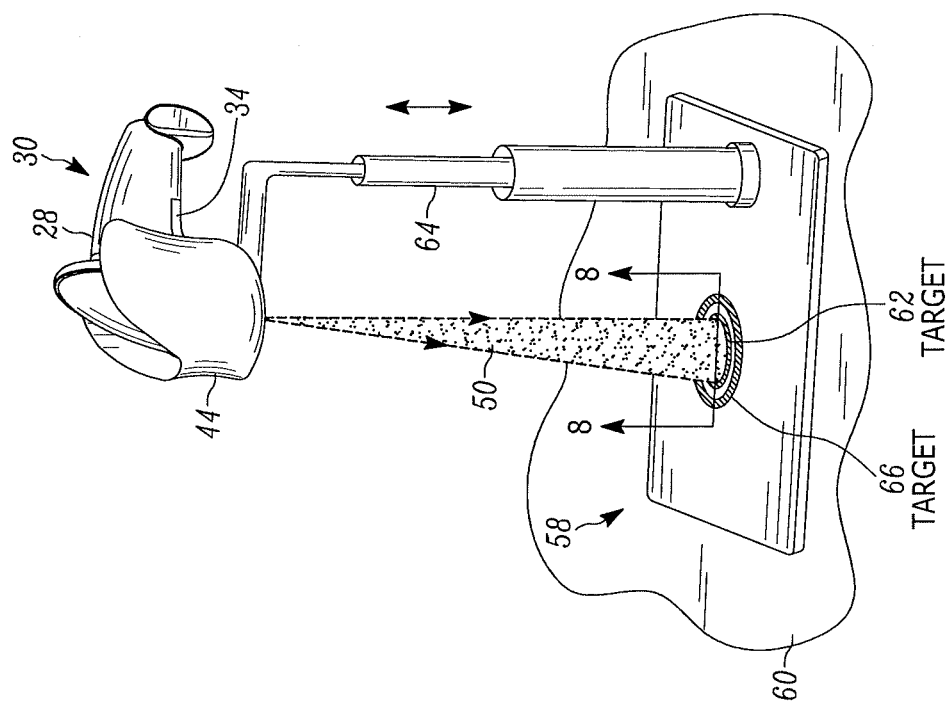
FIG. 6 is a perspective view of the reader mounted in the cradle of FIG. 5 being aimed at a target on still another embodiment of a document capture stand prior to capturing an image of a document.
Figure 7:
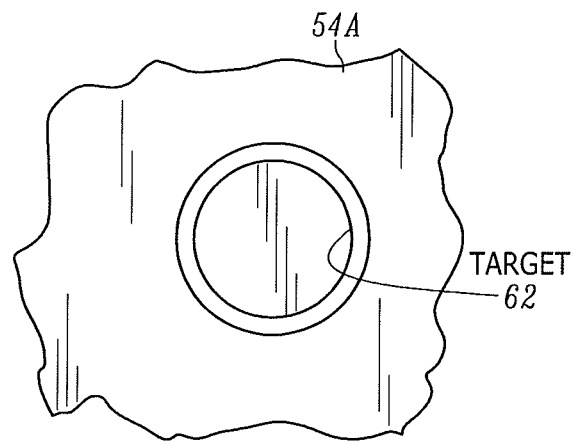
FIG. 7 is a broken-away, enlarged front view of the stand of FIG. 3.
Figure 8:
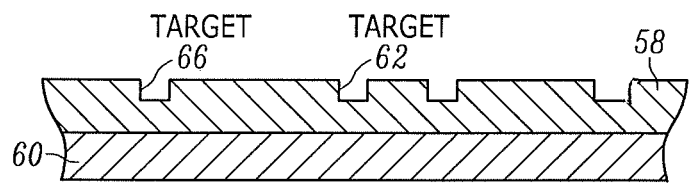
FIG. 8 is a sectional view taken on line 8-8 of FIG. 6.

Each stand is provided with a visible target 62 fixed on the stand. The target 62 has a predetermined target size. For example, as best illustrated in FIG. 7, the target 62 has a circular outline or shape. The target 62 is advantageously engraved in the stand, or may be printed on a label that is adhesively secured to the stand. The target 62 may have myriad other shapes. Each stand may also be fixed with a plurality of targets. Thus, as best shown in FIGS. 6 and 8, another visible target 66 is fixed on the stand 58. The target 66 also has a circular outline and is concentric with the target 62. Target 62 has a smaller diameter than target 66. The targets 62, 66 need not have the same shape or be nested as shown, but could also be spaced away from each other on the stand.

Figure 3:
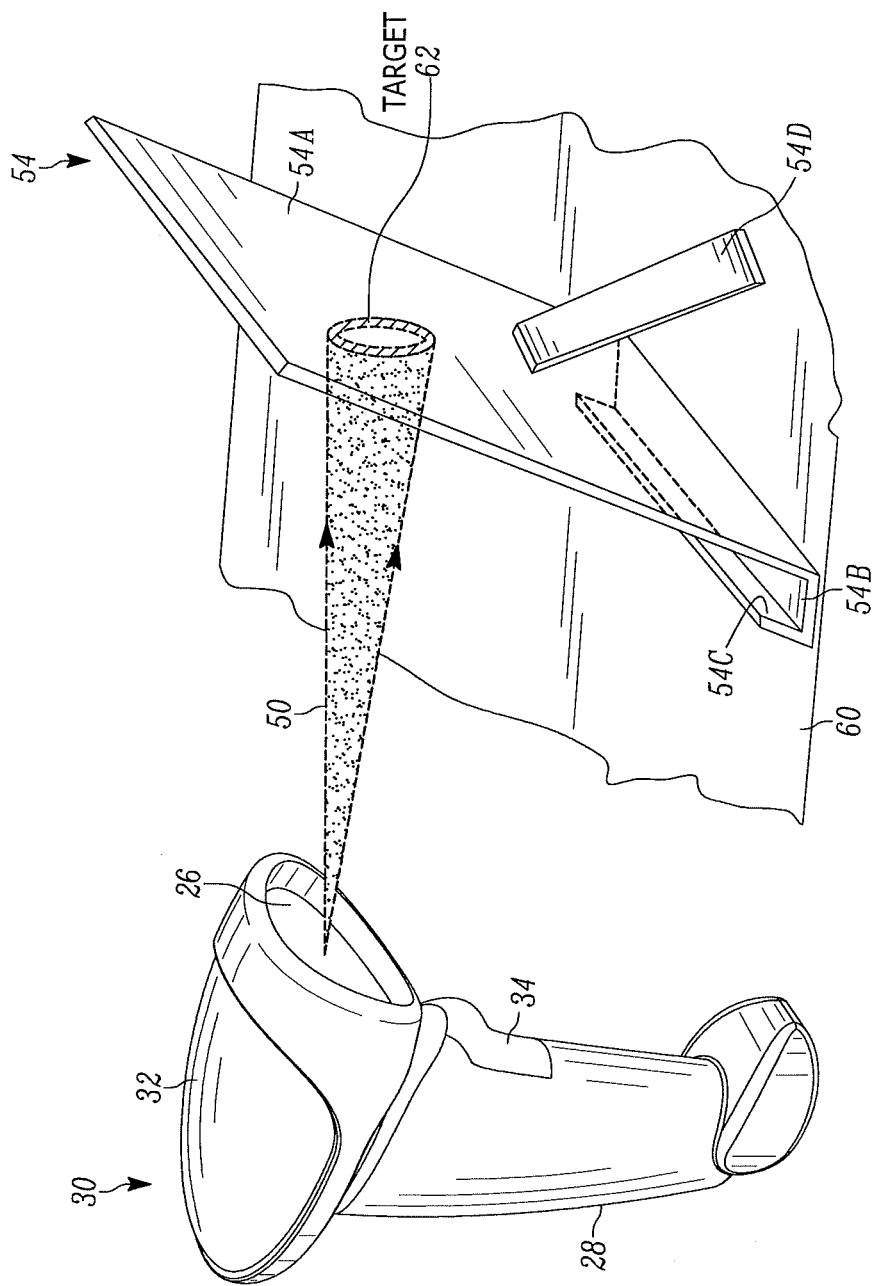
FIG. 3 is a perspective view of the reader of FIG. 1 being aimed at a target on one embodiment of a document capture stand prior to capturing an image of a document.
Figure 4:
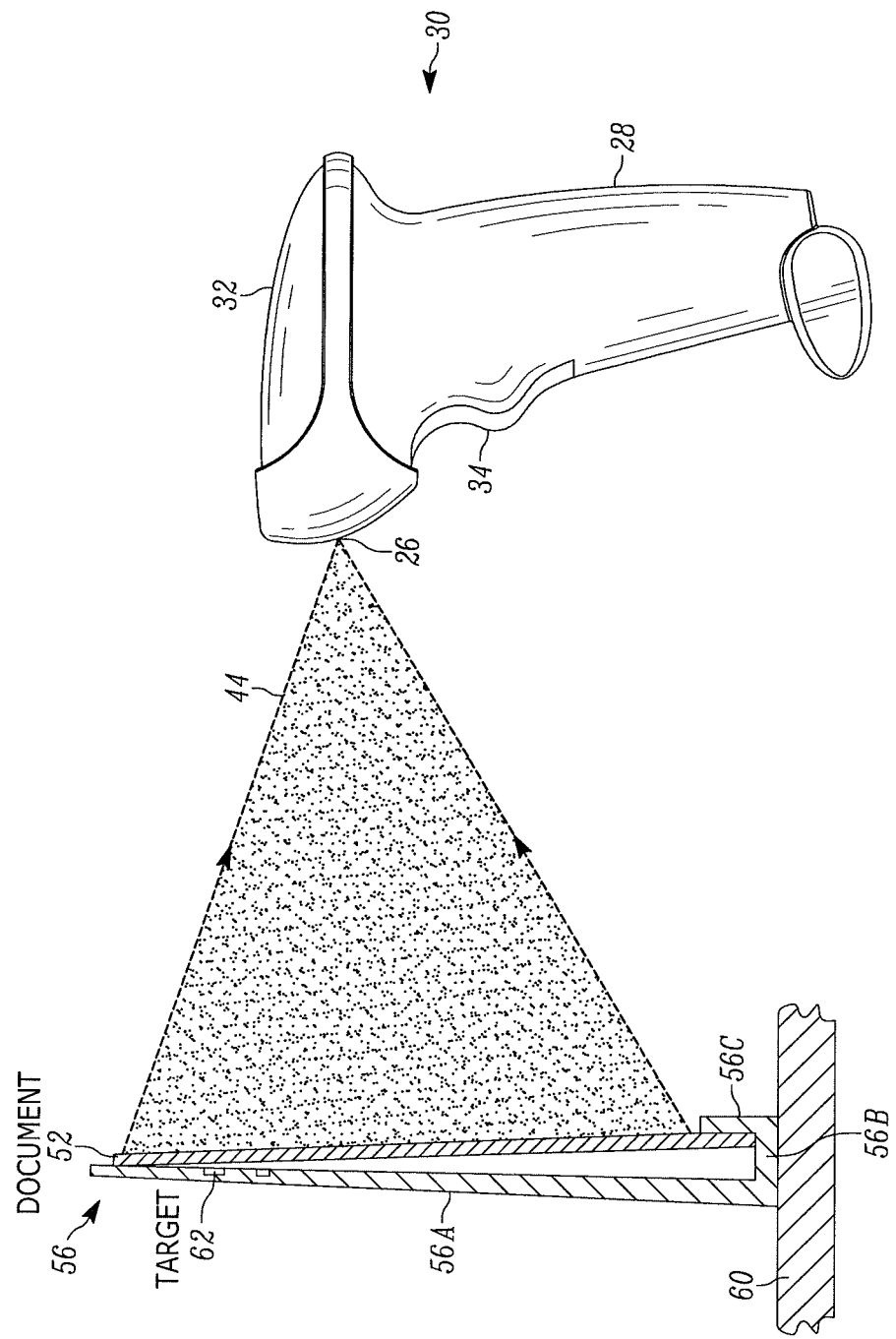
FIG. 4 is a part-sectional, part-elevational view of the reader of FIG. 1 during image capture of a document on another embodiment of a document capture stand.
Figure 5:
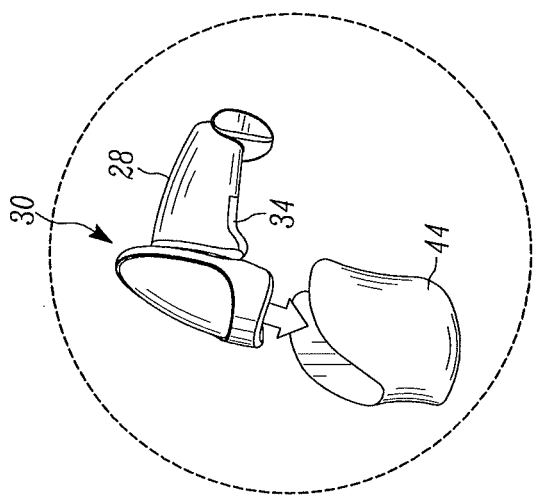
FIG. 5 is a perspective view of the reader of FIG. 1 being mounted in a cradle.

The aforementioned aiming light assembly is operative for directing the visible aiming light beam 50 (see FIG. 3) along an aiming axis upon initially depressing the trigger 34. The visible aiming light beam has a generally conical shape with known divergence angles along mutually orthogonal directions, as well as a beam size that in cross-section increases along the aiming axis in a direction away from the reader 30. The reader 30 is movable relative to the stand along the aiming axis until the beam size visually matches the target size at a predetermined distance between the reader and the stand. In the embodiments of FIGS. 3 and 4, the handheld reader 30 is movable by the operator. In the embodiment of FIGS. 5 and 6, the cradle-supported reader 30 is movable by the cradle 44 whose height above the stand 58 is adjusted by extending or collapsing a plurality of telescoping sections 64.

The smaller circular target 62 is designed to enable a smaller sized document 52 to be subsequently substantially captured in full frame and in focus at a shorter predetermined distance, and the larger circular target 66 is designed to enable a larger sized document 52 to be subsequently substantially captured in full frame and in focus at a larger predetermined distance. Preferably, the cross-sectional beam size is a circular spot that is congruent to either the circular target 62 or the circular target 66 at the corresponding predetermined distance. Advantageously, the circular beam spot completely fills the circular outline of either the target 62 or the target 66 at the corresponding predetermined distance. Thus, an operator need only move the reader 30 until the beam spot is congruent with the target 62 to read a smaller sized document 52, or until the beam spot is congruent with the target 66 to read a larger sized document 52.

In a preferred exemplary embodiment, the diameter of the larger circular target 66 is about one inch; the predetermined distance is about twelve inches; and the document 52 whose image is to be subsequently captured measures about 8.5 inches by about 11 inches. In another preferred embodiment, the diameter of the smaller circular target 62 is about one-half inch; the predetermined distance is about eight inches; and the document 52 whose image is to be subsequently captured measures about 5.5 inches by about 8.5 inches. Thus, the operator need only aim at a selected one of the targets 62, 66 to accommodate a document of a certain size.

Once the predetermined distance has been determined, the document 52 is placed on the stand, and either the handheld reader 30 of FIGS. 3 and 4 is held steady, or the cradle-supported reader 30 of FIGS. 5 and 6 is locked in position by locking the telescoping sections 64, while the reader 30 is operated, typically by further depressing the trigger 34 to capture an image of the document 52 over the field of view 44. As before, the electrical signals generated by the imager 24 are processed by the controller 36 into a picture of the document 52.

Figure 9:
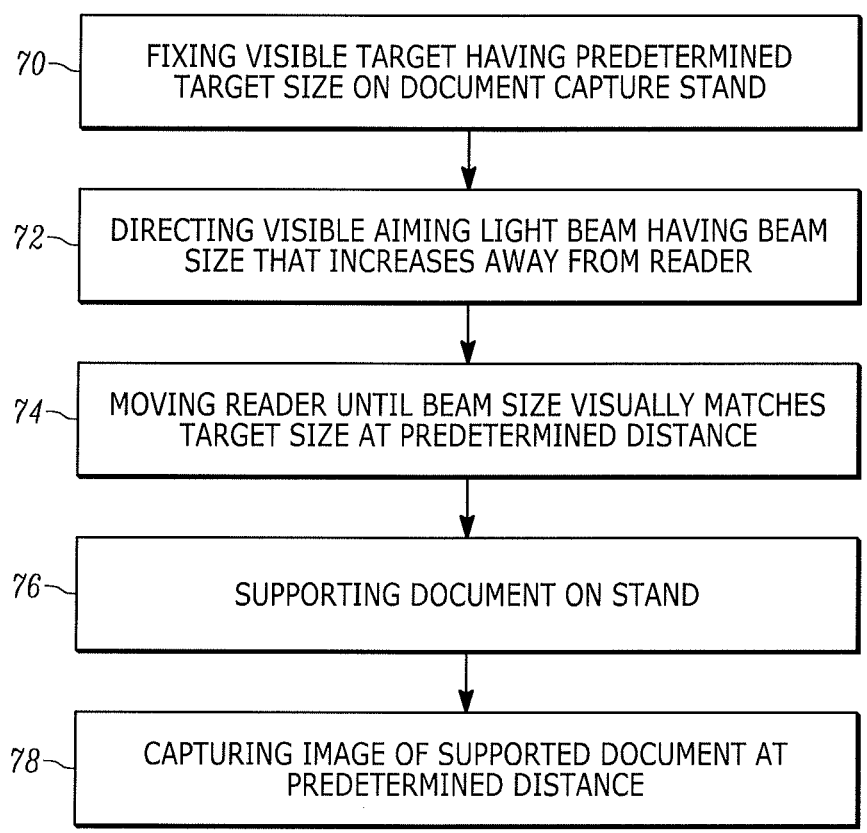
FIG. 9 is a flow chart depicting the steps performed in capturing images of documents in accordance with this disclosure.

The method of capturing images of documents is performed, with reference to the flow chart of FIG. 9, by fixing a visible target 62 and/or 66 having a predetermined target size on a document capture stand (step 70), directing a visible aiming light beam 50 along an aiming axis away from an imaging reader 30, the visible aiming light beam 50 having a beam size in cross-section that changes along the aiming axis (step 72), by moving the reader 30 relative to the stand along the aiming axis until the beam size visually matches the target size at a predetermined distance between the reader 30 and the stand (step 74), supporting a document 52 on the stand (step 76), and by capturing an image of a document 62 supported by the stand at the predetermined distance (step 78).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements, but may include other elements not expressly listed or inherent to such process, method, article, or apparatus. An element proceeded by "comprises . . . a," "has . . . a," "includes . . . a," or "contains . . . a," does not, without more constraints, preclude the existence of additional identical elements in the process, method, article, or apparatus that comprises, has, includes, or contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1%, and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors, and field programmable gate arrays (FPGAs), and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein, will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. An arrangement for capturing images of documents, comprising:
   a document capture stand;
   a visible target fixed on the stand, the target having a predetermined target size;
   an imaging reader;
   an aiming light assembly supported by the reader, and operative for directing a visible aiming light beam along an aiming axis, the visible aiming light beam having a beam size in cross-section that changes along the aiming axis;
   the reader being movable relative to the stand along the aiming axis until the beam size visually matches the target size at a predetermined distance between the reader and the stand; and
   the reader being operative for capturing an image of a document supported by the stand at the predetermined distance.

2. The arrangement of claim 1, wherein the beam size increases in cross-sectional area along the aiming axis away from the reader.

3. The arrangement of claim 1, wherein the target has a circular shape, and wherein the beam size is a circular spot that is congruent to the circular target at the predetermined distance.

4. The arrangement of claim 1, and another visible target fixed on the stand.

5. The arrangement of claim 1, wherein the stand is mounted upright on a generally horizontal support surface for supporting the document upright.

6. The arrangement of claim 1, wherein the stand is mounted horizontally on a generally horizontal support surface for supporting the document horizontally.

7. The arrangement of claim 1, wherein the reader has a handle that is held in a hand of an operator during movement relative to the stand.

8. The arrangement of claim 1, wherein the reader is mounted in a cradle that is movable relative to the stand.

9. The arrangement of claim 1, wherein the aiming light assembly includes an aiming light source and an aiming lens.

10. The arrangement of claim 1, wherein the reader includes an imaging array of sensors, and an imaging lens assembly for capturing return light from the document supported by the stand over a field of view, and for projecting the return light onto the imaging array to capture the image of the document over the field of view at the predetermined distance.

11. A method of capturing images of documents, comprising:
    fixing a visible target having a predetermined target size on a document capture stand;
    directing a visible aiming light beam along an aiming axis away from an imaging reader, the visible aiming light beam having a beam size in cross-section that changes along the aiming axis;
    moving the reader relative to the stand along the aiming axis until the beam size visually matches the target size at a predetermined distance between the reader and the stand; and
    capturing an image of a document supported by the stand at the predetermined distance.

12. The method of claim 11, wherein the directing is performed by increasing the beam size in cross-sectional area along the aiming axis away from the reader.

13. The method of claim 11, and configuring the target with a circular shape, and configuring the beam size as a circular spot that is congruent to the circular target at the predetermined distance.

14. The method of claim 11, and fixing another visible target on the stand.

15. The method of claim 11, and mounting the stand upright on a generally horizontal support surface for supporting the document upright.

16. The method of claim 11, and mounting the stand horizontally on a generally horizontal support surface for supporting the document horizontally.

17. The method of claim 11, and holding the reader in a hand of an operator during movement relative to the stand.

18. The method of claim 11, and mounting the reader in a cradle, and moving the cradle relative to the stand.

19. The method of claim 11, wherein the directing is performed by an aiming light source and an aiming lens.

20. The method of claim 11, wherein the capturing is performed by capturing return light from the document supported by the stand over a field of view at the predetermined distance.

* * * * *